O. LONG.
Filter.
No. 222,977. Patented Dec. 23, 1879.
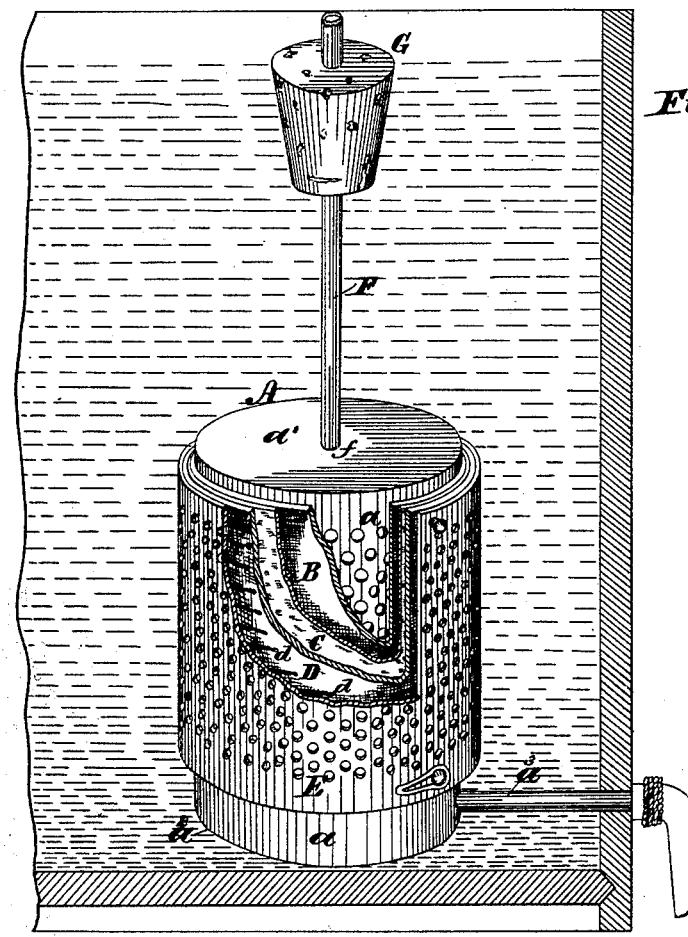
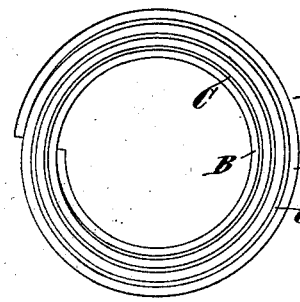
WITNESSES:
Saml. J. VanStavoren
D. P. Cowe
INVENTOR,
Oliver Long,
By Connolly Bros.,
ATTORNEYS
N. PETERS, PHOTO-LITHOGRAPHER, WASHINGTON, D. C.

UNITED STATES PATENT OFFICE.

OLIVER LONG, OF PHILADELPHIA, PENNSYLVANIA.

IMPROVEMENT IN FILTERS.

Specification forming part of Letters Patent No. 222,977, dated December 23, 1879; application filed June 23, 1879.

*To all whom it may concern:*

Be it known that I, OLIVER LONG, of Philadelphia, in the county of Philadelphia and State of Pennsylvania, have invented certain new and useful Improvements in Filters; and I do hereby declare the following to be a full, clear, and exact description of the invention, such as will enable others skilled in the art to which it pertains to make and use it, reference being had to the accompanying drawings, which form part of this specification, in which—

Figure 1 is a sectional view of a receptacle and a perspective of the filter, partly in section. Fig. 2 is a broken sectional perspective of a modification of the manner of wrapping the filtering-paper and its re-enforced covering, and Fig. 3 is a plan of the same.

My invention consists of a filter or filters designed for use in any vessel containing liquid to be filtered or clarified, the medium of filtration of which is filtering-paper, or unsized paper fortified or protected as the work to be accomplished requires, such filtering-paper having hitherto no employment except in funnels for small quantities of liquid, whereas by my invention filtering-paper can be employed for purposes of filtration to any desired extent.

In carrying my invention into effect I take any box, keg, or cylinder of metal, wood, or other suitable material, having its sides and top, or sides only, perforated or otherwise open to the inflow of liquid, and I wrap around the perforated material with one or more pieces of filtering-paper, securing the top and bottom, or one or either of them, as the work demands, so that no leak can occur there of the liquid to be clarified into the chamber receiving the filtered liquor.

If the top is perforated or otherwise open to the percolation of liquids, I tie over it a sufficient piece of the filtering-paper and such other materials as I may find useful for its preservation or protection, as hereinafter described.

To afford a soft bed on which the paper can tie without injury or abrasion by contact with the sides of the vessel, or the wire-netting or gauze-body of it, around which it is wrapped, I prefer to first wrap around the filtering-vessel a piece of a porous textile fabric; also, to protect it from abrasion or disturbance on its outer surface, in contact with the unfiltered liquid, I similarly prefer to wrap around the paper a piece of such porous textile fabric, thus sandwiching the paper between two layers of a porous textile fabric.

Over all, or around the side or sides, as where any contact with hard substances is possible, as in ice-coolers, I place a shield or cover of metal or other suitable hard material, prepared as above stated, having one or more openings for admission of the liquid to the action of the filtering-paper.

In its use for business purposes, or on a large scale for filtration of water, as for water-works, there is no necessity for the use of the metal shield; and in its use for business purposes the perforated vessel covered by the paper, &c., will not of necessity need to have a head to close it on the top, as the liquid will always be kept at a level below the edge of the top of the paper.

From the orifice on the sides or bottom of the filtering-chamber the filtered liquid is conveyed by a hose-tube, flexible or otherwise, to any faucet, pipe, double bottom, or other medium of passage for the conveyance of the clear liquid to any vessel appointed to receive it. In case the filter is submerged, means must be provided for the air-escape, and such means may consist of a flexible tube terminating at its upper end in a float which will keep said end always above the surface of the liquid to be filtered.

Referring to the accompanying drawings, A indicates a vessel, of cylindrical or other suitable shape, having sides $a$ and ends $a'$ $a^2$. Said sides are perforated or rendered foraminous in any suitable manner by forming them of wire-gauze, woven wire, lattice-work, or any other suitable or equivalent material.

B represents a bed of flannel or other soft textile and porous material surrounding the walls $a$, and C is the filtering material, consisting of a sheet or sheets of filtering, unglazed, or bibulous paper surrounding or resting upon or against the bed B. The paper C may consist of a single sheet or layer of the full thickness intended, having its edges lapped or otherwise secured, to render their junction or seam water-proof, or of several such sheets of a minor thickness, surrounding one another, forming layers. In practice, however, it will probably be preferable to employ the ordinary thin filtering-paper of commerce, and to wrap or fold this to form a helix or coil, whereby a succession of layers, each of which is very flexible, and therefore not likely to break or crack, may be produced of any desired thickness.

As a protector or re-enforce to the filtering-paper C, I surround it with a covering of flannel, D, a binding of cord, a wire, or other equivalent material, d, being wrapped outside the latter, thus securing the filtering material between the two textile pellicles to the filtering-vessel A.

As a further protection, in some cases a metallic or other rigid integument may be employed to prevent abrasion or other injury by contact of hard substances, such as lumps of ice in water-coolers. Said integument is shown at E, and consists of a sheet of wire-gauze or perforated metal surrounding the flannel band D, and duly secured by any suitable fastening device.

The operation is as follows: The filter, constructed as described, is submerged in the vessel containing the liquid required to be filtered. Such liquid percolates through the paper, and is thereby filtered, passing of course through the flannel wrap and rest and entering the vessel A. From the latter it flows through an outlet, $a^3$, which may connect with the faucet of the water-cooler or other escape of the reservoir in which it is placed.

In cases where the filter is wholly submerged (which will not always be the case, as already suggested) it will require to have an air-escape, which, by preference, will consist of a flexible tube, F, connected with the top of the vessel A, as shown at $f$, and having at its opposite extremity a float, G, whereby the end of said tube will be always sustained above the level of the liquid to be filtered.

While I have shown one specific construction whereby my invention may be carried into effect, I do not wish to be understood as limiting myself thereto, as such construction may be greatly varied within the limits of my improvements, which include, broadly, the utilization of paper as a filtering medium, when rendered available as such by the employment, in connection with it, of a re-enforce or pellicle.

By placing a number of such filters in any cask, tank, reservoir, or other receptacle for liquids to be filtered, each having its separate outlet into the common receiver of the filtered liquid, a larger additional surface of the filtering material is made available in the same vessel than in the use of one vessel only, however large its size, and the work of filtration of large quantities of liquids is performed in a small proportionate space, without constant personal attention, at a very low cost and with great rapidity, the work of one filter being multiplied by the number of filters employed in each tank. Thus in the case of a filter having a capacity for two and a half pints of water always in reserve, eight such filters being placed in a small tank eighteen inches square, the inflow being regulated to meet the outflow, the running of pure filtered liquid from even so small a set of filters will amount to sixty gallons per hour, while from a tank containing twenty-four such filters, but three feet high by six inches diameter, the running will be two thousand four hundred gallons per hour, or nearly sixty thousand gallons per twenty-four hours. Thus, by utilizing filtering-paper as a medium of filtration for large quantities of liquids, a filtering apparatus of the cheapest and simplest construction, perfect in its results, is available equally to the poorest family and to the largest works of industrial pursuits, such as those of brewers, wine, cider, and vinegar producers, and others to whom filtration is a necessity, and also those who do not, but would, use filtration as a means of clarifying their liquid if a cheap, rapid, and effective method of filtration had been hitherto available, and which my invention supplies.

In the interest of the health of the people there is the almost universal evidence of the medical profession, and the frequent reiteration of the press, that the water served by towns for drinking purposes is deleterious, and a frequent cause of prevailing epedemics and typhoid diseases, and that all such water should be filtered. This, from the expense of existing appliances, or the inadequacy of construction of filtering apparatus and devices at present offered, has been impossible except to the few, while, by the aid of my invention, not a drop of water need be drawn that is not filtered, by either rich or poor.

I do not claim as my invention a single vessel, cask, or tub, perforated or open on its sides or top, placed in any vessel containing liquid to be filtered, and covered only with any felt, flannel, or other textile fabric used for filtering purposes.

In lieu of the separate pieces of flannel or equivalent material to form the inner bed and outer covering for the paper-filtering medium, a single piece of flannel or like material may be employed, such piece being of greater length than the paper, as shown in Fig. 2, and it and the paper being wrapped together, as shown in Fig. 3, to form alternate helical coils or layers, surrounding the cylinder, the inner end of the flannel resting next to the latter, and its outer extremity extending beyond and surrounding the paper.

What I claim as my invention is—

1. A filtering medium consisting of filtering-paper re-enforced or protected by a porous textile pellicle, substantially as set forth.

2. The combination, with filtering-paper, of a soft textile bed, B, and a surrounding envelope or wrap, D, of similar material, substantially as shown and described.

3. The combination, with a vessel, A, having a foraminous or open wall, end, or side, of a filtering medium composed of paper protected by textile material, substantially as shown and described.

4. The combination of vessel A, having open or foraminous side *a*, textile bed B, filter-paper C, textile pellicle D, wrapping *d*, and rigid integument E, substantially as shown and described.

5. The combination, with a filtering-vessel designed and adapted to be submerged in the liquid which is to be filtered, of an air-escape, consisting of a flexible tube, F, with float G, substantially as shown and described.

In testimony that I claim the foregoing I have hereunto set my hand this 18th day of June, 1879.

OLIVER LONG.

Witnesses:
   AL. P. BURCHELL,
   SAML. J. VAN STAVOREN.